United States Patent [19]

Kawagoe et al.

[11] Patent Number: 4,785,583

[45] Date of Patent: Nov. 22, 1988

[54] SEAL FOR A SLIDABLE WINDOW OF A VEHICLE

[75] Inventors: Shigeyuki Kawagoe, Anjo; Haruhiko Terada, Chiryu; Jyouichi Banjyo, Himi, all of Japan

[73] Assignees: Aisin Seiki Kabushiki Kaisha, Ka Riya; Aisin Keikinzoku Kabushiki Kaisha, Shinmin Ato, both of Japan

[21] Appl. No.: 74,292

[22] Filed: Jul. 16, 1987

[30] Foreign Application Priority Data

Jul. 22, 1986 [JP] Japan .................. 61-112438[U]

[51] Int. Cl.⁴ .................................... E05D 15/06
[52] U.S. Cl. .................................... 49/404; 49/408; 49/413; 49/431
[58] Field of Search .......... 49/404, 413, 408, 431, 49/441, 440, 370

[56] References Cited

U.S. PATENT DOCUMENTS

| 3,808,742 | 5/1974 | Ehret et al. | 49/413 |
| 4,124,054 | 11/1978 | Spretnjak | 49/413 |
| 4,158,272 | 6/1979 | Riegelman | 49/404 X |
| 4,187,642 | 2/1980 | Morinaga et al. | 49/413 X |

Primary Examiner—Philip C. Kannan
Attorney, Agent, or Firm—Finnegan, Henderson, Farabow, Garrett & Dunner

[57] ABSTRACT

A sealing device for a slidable window of a vehicle. The window includes a channel member which has a plurality of grooves in which a slidable glass member and a fixed glass member are held individually. The sealing device comprises a weather strip for sealing the slidable window glass being disposed in the groove of the channel member for holding the fixed window glass.

8 Claims, 3 Drawing Sheets

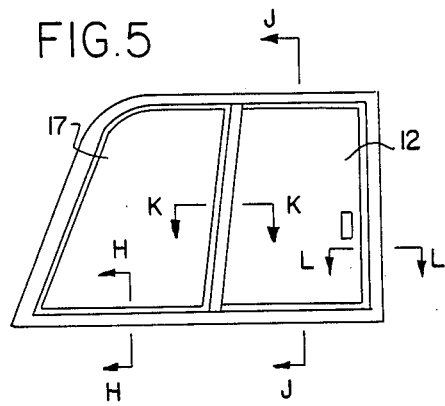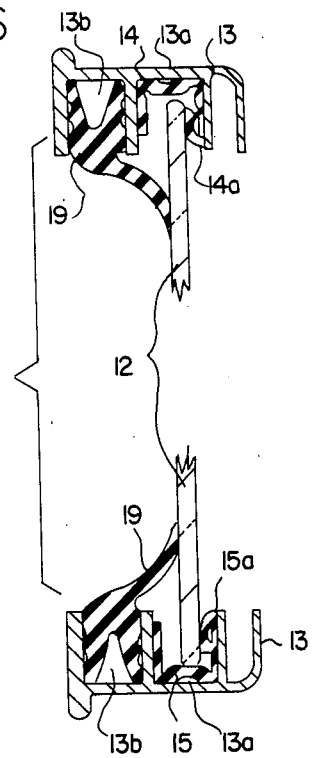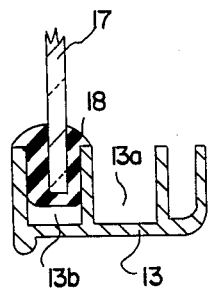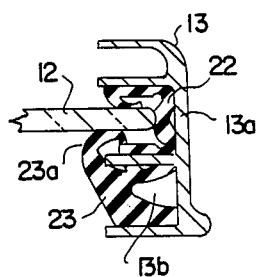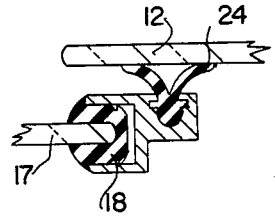

U.S. Patent  Nov. 22, 1988  Sheet 3 of 3  4,785,583
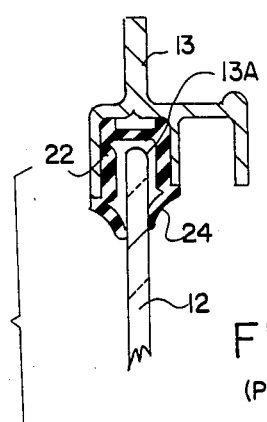
FIG. 10
(PRIOR ART)
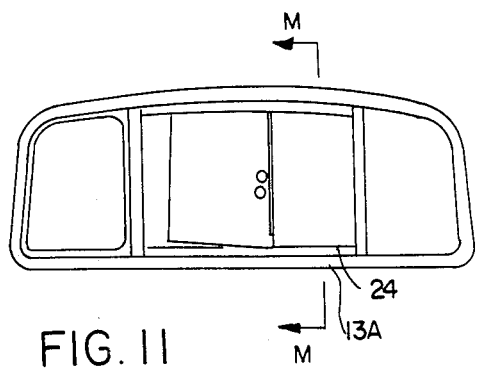
FIG. 11
(PRIOR ART)
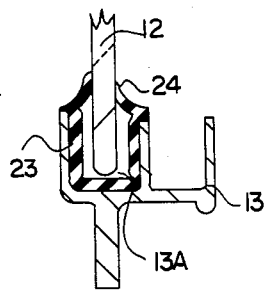
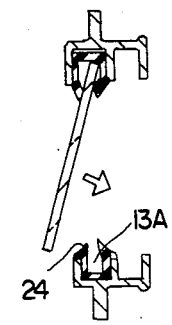
FIG. 12
(PRIOR ART)
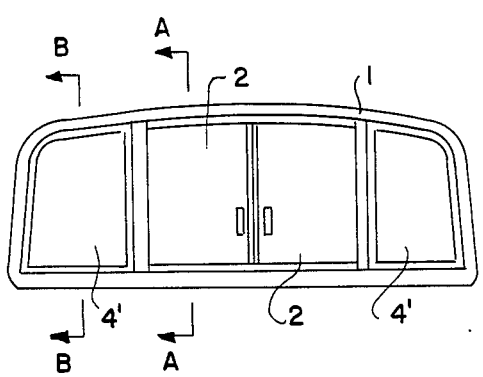
FIG. 13
(PRIOR ART)
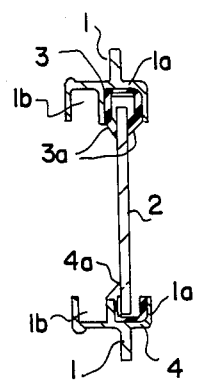
FIG. 14
(PRIOR ART)
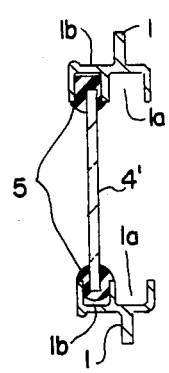
FIG. 15
(PRIOR ART)

SEAL FOR A SLIDABLE WINDOW OF A VEHICLE

BACKGROUND OF THE INVENTION

This invention relates to a slidable window of a vehicle and more particularly to a sealing device for a slidable window of a vehicle.

One conventional sealing device for a slidable window of a vehicle is disclosed in Laid-Open Japanese Utility Registration Application No. 155622/1985. As shown in FIGS. 13, 14 and 15, slidable window glass member 2 is slidably held between an upper and a lower groove 1a of a channel member 1 through corresponding upper and lower glass runs 3 and 4 press fitted into the corresponding grooves. Upper glass run 3 has a pair of downwardly protruding reversing lips 3a embracing the upper glass portion while lower glass run 4 has an upwardly protruding reversing lip 4a provided only on the single side of and integrally of lower glass run 4. In FIG. 15, a fixed glass (permanently fixed window glass) member 4' is held in a groove 1b of a channel member 1 through a weather strip 5 pressed into channel groove 1b.

Recently, the width of the channel members has thinned and the width of channel grooves 1a, 1b becomes narrow. Thus the thickness of glass runs 3, 4 has thinned and reversing lips 3a, 4a provided in glass runs 3, 4 have also thinned. Therefore, the skirting portion of lips 3a, 4a becomes less stiff so that its sealing force against slidable glass member 2 is weak and may not prevent the ingress of dust or water into the compartment of the vehicle.

Therefore it is a technical object of this invention to improve the sealing force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided a seal device for a slidable window of a vehicle, the window including a channel member which has a plurality of grooves in which a slidable glass member and a fixed glass member are held individually. The seal device comprises a weather strip for sealing the slidable window glass being disposed in the groove of the channel member for holding the fixed window glass.

According to this device, a glass run in which the movable glass is held slidably, and a reversing lip for sealing the movable glass member are provided separately as weather strips. Thus a relatively narrow glass run does not adversely affect the weather strip to thereby ensure reliable sealing.

BRIEF DESCRIPTION OF THE DRAWINGS

The accompanying drawings, which are incorporated in and constitute a part of the specification, illustrate preferred embodiments of the invention and, together with a general description of the invention given above and the more detailed description of the preferred embodiments given below, serve to explain the principles of the invention.

FIG. 5 is an elevational view of a slidable side window of a second embodiment of this invention;

FIG. 6 is a cross-sectional view taken along the line J—J of FIG. 5;

FIG. 7 is a cross-sectional view taken along the line H—H of FIG. 5;

FIG. 8 is a cross-sectional view taken along the line L—L of FIG. 5;

FIG. 9 is a cross-sectional view taken along the line K—K of FIG. 5;

FIG. 10 is a cross-sectional view taken along the line M—M of FIG. 11;

FIG. 11 is an elevational view of a prior art slidable window;

FIG. 12 illustrates a method of mounting a slidable glass member according to a prior art method;

FIG. 13 is a front view of a conventional slidable window;

FIG. 14 is a cross-sectional view taken along the line A—A of FIG. 13; and

FIG. 15 is a cross-sectional view taken along the line B—B of FIG. 13.

DETAILED DESCRIPTION OF PREFERRED EMBODIMENTS

Embodiments of this invention will now be described with reference to the accompanying drawings.

Figure 1:
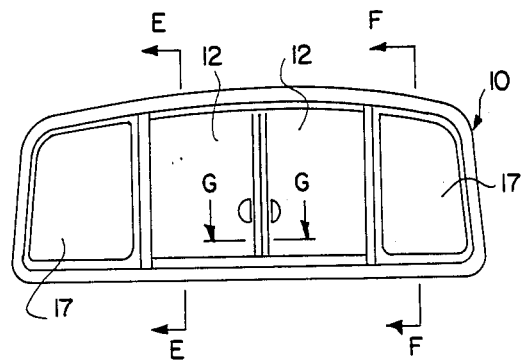
FIG. 1 is an elevational view of a slidable rear window for a truck according to a first embodiment of this invention.

FIG. 1 shows a slidable rear window 10 for a truck as a first embodiment. Rear window 10 includes a pair of fixed end glass members 17 and a pair of central slidable glass members 12 between the pair of fixed end glass members.

Figure 2:
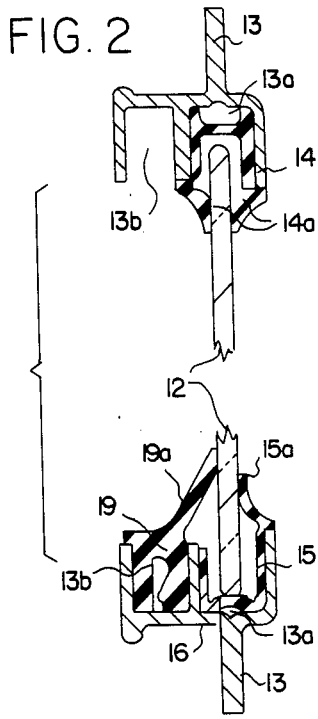
FIG. 2 is a cross-sectional view taken along the line E—E of FIG. 1.

In FIG. 2, slidable glass members 12 are held in a compartment side groove 13a of a channel member 13 through an upper and a lower glass run 14 and 15 press fitted into groove 13a. Upper glass run 14 has a pair of downwardly protruding reversing lips 14a integral therewith and embracing slidable glass member 12 between the lips. Hairs are implanted onto the surface of upper glass run 14 contacting slidable glass member 12 so that no dust enters the compartment. In addition, slidable glass member 12 is arranged to slide smoothly. Lower glass run 15 has an upwardly protruding reversing lip 15a integral therewith only on one side (compartment side) of slidable glass member 12. In order to obtain good drainage, lower glass run 15 has no hairs implanted thereon and a plurality of drainage holes 16 provided at proper intervals in groove 13a and lower glass run 15.

Figure 3:
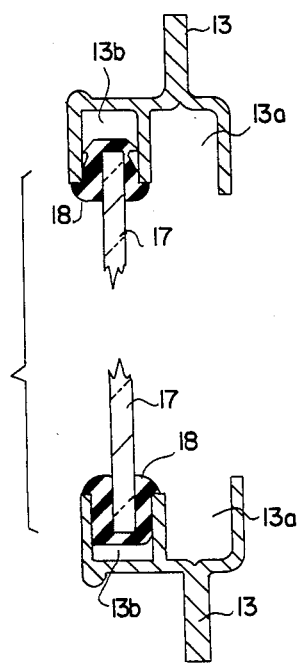
FIG. 3 is a cross-sectional view taken along the line F—F of FIG. 1.

In FIG. 3, each fixed glass member 17 is held in an outer groove 13b of channel member 13 through a weather strip 18 press fitted into groove 13b. In FIG. 2, a weather strip 19 is press fitted into a portion of lower groove 13b in which fixed glass member 17 is not held, namely, in juxtaposition with the lower groove 13a in which slidable glass member 12 of FIG. 1 is held. Each weather strip 19 has an upwardly protruding reversing lip 19a integral therewith which abuts window glass member 12 for sealing purposes. Hairs 26 are implanted on the surface of lip 19a abutting slidable glass member 12.

Figure 4:
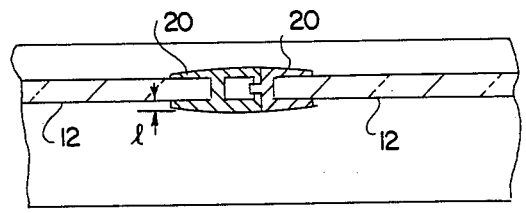
FIG. 4 is a cross-sectional view taken along the line G—G of FIG. 1.

As shown in FIG. 4, channel members 20 are provided at a place where two slidable glass members 12 abut for sealing purposes. This results in a step 1 on the side of channel member 20 and slidable glass member 12 to thereby form a water entrance, so that hairs are implanted to fill the step 1. The hairs are bonded on the lip portion 19a of weather strip 19 to fill the gap 1 between channel member 20 and slidable glass member 12.

FIG. 5 shows a second embodiment of the present invention which is a slidable side window 21 which includes a fixed glass member 17 and a slidable glass member 12.

In FIG. 6, upper and lower glass runs 14 and 15 for slidable glass member 12 have reversing lips 14a, 15a protruding into corresponding grooves 13a in channel members 13. A weather strip 19 is provided not only in upper channel groove 13b but also in lower channel groove 13b compared to the embodiment of FIG. 1 in which only a single weather strip 19 is provided in lower channel groove 13b. Thus sealing is further improved. The surface of each weather strip 19 contacting groove 13b has pawl-like portions engaged in channel groove 13b so as not to readily slip off the groove.

In FIG. 7, fixed glass member 17 is held in channel groove 13b through weather strip 18 which also has pawl-like portions as described above.

As shown in FIG. 8, a side glass run 22 and a weather strip 23 such as that shown in the first embodiment are disposed in grooves 13a and 13b in side channel 13 as in the first embodiment, to improve sealing at the side channel 13 when the slidable glass member is closed. Weather strip 23 has a lip 23a protruding toward groove 13a of channel member 13, allowing for the sealing of slidable glass member 12.

As shown in FIG. 9, in order to improve sealing between slidable glass member 12 and fixed glass member 17, a bifurcated weather strip 24 having hairs 28 thereon extends throughout from the lower glass run 15 to upper glass run 14 along fixed glass 17.

In order to obtain a similar effect, as shown in FIG. 10, it could be conceived that upper and lower glass runs 22 and 23 each have a pair of reversing lips 24 embracing therebetween the corresponding portion of slidable glass member 12. However, according to this method, as shown in FIG. 11, when slidable glass member 12 is mounted as shown in FIG. 12, the reversing lips 24 may enter the corresponding groove 13A, so that mounting of the slidable glass member will be time consuming. However, according to this invention, in a slidable window of a vehicle with a channel member which has a plurality of grooves holding a slidable glass member and a fixed glass member therein separately, a weather strip sealing the slidable window glass is disposed in the channel groove for helding the fixed glass member. Therefore, after the slidable glass member is mounted, the weather strip is mounted, so that this method is not time consuming. A glass run may be thinned to perform reliable sealing without affecting the weather strip adversely.

It will be apparent to those skilled in the art that various modifications and variations can be made to the present invention without departing from the scope or spirit thereof, and such modifications and variations are deemed to come within the scope of the appended claims.

What is claimed is:

1. A vehicle window assembly, comprising:
    channel means including a first pair of upper and lower channel members and a second pair of upper and lower channel members disposed substantially adjacent said first pair of channel members;
    a stationary window fixedly mounted within said first pair of channel members;
    a movable window slidably mounted within said second pair of channel members, said movable window being adjustably positioned relative to said stationary window;
    first weather stripping means formed along a peripheral portion of said stationary window and disposed within said first pair of upper and lower channel members for holding said stationary window within said first pair of channel members;
    guide run means for slidably supporting said movable window within said second pair of channel members, said guide run means including upper and lower guide run members disposed within said second pair of upper and lower channel members, respectively, said upper guide run member having a bifurcated lip section engaging first and second opposite surfaces of said movable window and said lower guide run member having a single lip section engaging the first surface of said movable window; and
    second weather stripping means disposed within said lower channel member of said first pair of upper and lower channel members, said second weather stripping means including a protruding lip for engaging the second surface of said movable window opposite said lower guide run member lip section, said movable window being supported along said second pair of channel members by said protruding lip and said upper and lower guide run member lip sections.

2. The vehicle window assembly recited in claim 1, wherein the bifurcated lip section of the upper guide run member includes hairs extending inwardly toward the movable window.

3. The vehicle window assembly recited in claim 2, wherein the lower guide run member and the lower channel member of the second pair of upper and lower channel members are provided at spaced intervals with drainage holes.

4. A vehicle window assembly, comprising:
    channel means including a first pair of upper and lower channel members and a second pair of upper and lower channel members disposed substantially adjacent said first pair of channel members;
    a stationary window fixedly mounted within said first pair of channel members;
    a movable window slidably mounted within said second pair of channel members, said movable window being adjustably positioned relative to said stationary window;
    first weather stripping means formed along a peripheral portion of said stationary window and disposed with said first pair of upper and lower channel members for holding said stationary window within said first pair of channel members;
    guide run means for slidably supporting said movable window within said second pair of channel members, said guide run means including upper and lower guide run members disposed within said second pair of upper and lower channel members, respectively, at least one side of each of said upper and lower guide run members engaging a first surface of said movable window; and second weather stripping means disposed within said first pair of upper and lower channel members, said second weather stripping means including a protruding lip for engaging a second surface of said movable window opposite the first surface thereof, said movable window being supported along said second pair of channel members by said protruding lip and the side of said upper and lower guide run members engaging said movable window.

5. The vehicle window assembly as recited in claim 4, further comprising:

first and second substantially adjacent side channel members, said first side channel member extending between the first pair of upper and lower channel members and said second side channel member extending between the second pair of upper and lower channel members;

a side guide run member disposed within said second side channel, at least one side of said side guide run member for engaging the first surface of the movable window; and a third weather stripping means disposed within said first side channel, said third weather stripping means including a protruding lip for engaging the second surface of said movable window, said movable window being engaged with said protruding lip of said third weather stripping means and said at least one side of said side guide run member when said movable window is in a closed position.

6. The vehicle window assembly as recited in claim 4, wherein the lower guide run member and the lower channel member of the second pair of upper and lower channel members are provided at spaced intervals with drainage holes.

7. The vehicle window assembly as recited in claim 4, further comprising a bifurcated weather strip extending between the upper and lower channel members of the first and second pairs of channel members, said bifurcated weather strip having two lip sections engaging the second surface of the movable window.

8. The vehicle window assembly as recited in claim 7, wherein the two lip sections of the bifurcated weather strip include hairs extending inwardly toward the movable window.

* * * * *

UNITED STATES PATENT AND TRADEMARK OFFICE
CERTIFICATE OF CORRECTION

PATENT NO. : 4,785,583

DATED : November 22, 1988

INVENTOR(S) : Shigeyuki Kawagoe; Haruhiko Terada; and Jyouichi Bansho

It is certified that error appears in the above-identified patent and that said Letters Patent is hereby corrected as shown below:

Title page:

Item [75]: correct the spelling of the third named inventor to read -- Jyouichi Bansho --.

Signed and Sealed this

Sixteenth Day of May, 1989

Attest:

DONALD J. QUIGG

*Attesting Officer*       Commissioner of Patents and Trademarks